United States Patent Office 3,374,069
Patented Mar. 19, 1968

3,374,069
PREPARATION OF METAL CARBONATES BY $CO_2$ - PRESSURIZING ANHYDROUS METAL ACETATES
Earl L. Head, Los Alamos, N. Mex., assignor to the United States of America as represented by the United States Atomic Energy Commission
No Drawing. Filed Mar. 16, 1967, Ser. No. 624,667
1 Claim. (Cl. 23—345)

ABSTRACT OF THE DISCLOSURE

In a method of forming metal carbonates by pressurizing acetate solutions in a carbon dioxide atmosphere, the improvement wherein the said acetate is anhydrous and is selected from the group consisting of the rare earth acetates, thorium acetate, uranyl acetate and yttrium acetate.

---

The invention described herein was made in the course of, or under, a contract with the U.S. Atomic Energy Commission.

In a patent application filed by the present inventor on Sept. 27, 1965, U.S. patent application Ser. No. 490,750, on the Preparation of the Rare Earth Carbonates, an improved method of preparing rare earth carbonates was set forth whereby carbon dioxide pressure was applied to aqueous solutions of the formates, acetates, propionates and butyrates of the rare earths at or near room temperature. Although this method was a substantial advance over the prior art, carbonate yields were comparatively low (on the order of 30–50%) and the magnitude of the carbonate yields was random.

The inventor has discovered that the use of the anhydrous acetate has resulted in reproducibly increased yields of the order of 75–100% in some cases over those obtained formerly with the hydrated acetate salts.

Because of the stability of carbonates they are useful as shelf reagents and are particularly useful in adjusting hydrogen ion concentrates. Furthermore, actinide and lanthanide carbonates have been of interest in preparation of phosphors. Thorium carbonate has been proposed for use in the preparation of $U^{233}$.

The anhydrous Th, uranyl, La, Ce, and Pr acetates were prepared from commercially available hydrated nitrates of 99.9% purity and the anhydrous Tb and Y acetates from saturated chloride solutions obtained by dissolving $TbO_{1.81}$ and $Y_2O_3$ in concentrated HCl. The thorium and uranyl acetates were prepared by refluxing the nitrates in a 50% acetic acid-acetic anhydride mixture for 3 hours and the remaining acetates by refluxing the respective starting materials in acetic anhydride for 4 hours. All preparations were carried out under flowing $N_2$ gas. Finally the reaction mixture was cooled to 25° C. and filtered under argon on a sintered glass disc. Acetone and ether were used as wash media. The anhydrous acetates were stored in a vacuum desiccator which contained anhydrous $Mg(ClO_4)_2$. The method of preparing the particular anhydrous acetate used is, of course, not a part of this invention.

The general procedure for preparing the carbonates is as follows. The anhydrate acetate is mixed with water in a glass beaker. The glass beaker containing the acetate-water mixture (the salt is not immediately soluble) is sealed in a pressure reactor (1) which is then filled with $CO_2$ gas to the desired pressure. Admission of the $CO_2$ is begun within about 3 miutes after the water is added to the sample. The reactor is heated to the operating temperature in 15 minutes and there maintained for the desired period. The reaction is terminated by cooling the reaction mixture to 25° C. releasing the pressure, and recovering the carbonate product by filtration on a sintered glass disc. The product is washed with acetone and ether and left exposed to air for at least 4 hours before placing in a closed bottle.

Table I lists the specific conditions utilized to obtain thorium dicarbonate, uranyl carbonate and the rare earth sesquicarbonates.

TABLE I.—DATA FOR CARBONATES PREPARED FROM ANHYDROUS ACETATES

| Sample | Initial Conc. (Acetate Salt) (moles/liter) | Reaction Conditions | | | Carbonate Product Analyses | | | | Medium for Reaction [1] |
|---|---|---|---|---|---|---|---|---|---|
| | | Time (hrs.) | Temp. (° C.) | $CO_2$ Pressure (p.s.i.g.) | Mole Ratio $CO_2$/MO | Mole Ratio $H_2O$/MO | ($CO_2$+$H_2O$+Oxide) (percent) | Yield (percent) | |
| | | | | Thorium Dicarbonate | | | | | |
| 1 | .035 | 15 | 30 | 850 | 1.99 | 3.60 | 100.9 | 91 | |
| 2 | .035 | 2 | 46 | 880 | 1.99 | 3.57 | 100.1 | 91 | |
| 3 | .05 | 2 | 60 | 500 | 1.93 | 3.01 | 100.1 | 95 | |
| 4 | .05 | 2 | 60 | [2] 200→850 | 1.95 | 3.16 | 100.0 | 94 | |
| 5 | .05 | 15 | 60 | 950 | 1.96 | 3.29 | 100.5 | 94 | |
| | | | | Uranyl Carbonate | | | | | |
| 1 | .08 | 10 | 30 | 900 | .94 | .72 | 98.8 | 90 | 95% Ethanol. |
| 2 | .10 | 2 | 53 | 900 | .94 | .75 | 99.1 | 91 | Do. |
| 3 | .10 | 2 | 93 | 900 | .98 | .21 | 98.6 | 84 | |
| 4 | .05 | 2 | 54 | 200 | .95 | .77 | 99.0 | 88 | Do. |
| 5 | .05 | 14 | 30 | 850 | .97 | .71 | 99.1 | 58 | |
| | | | | $Ln_2(CO_3)_3$ General Formula for Rare Earth Sesquicarbonate | | | | | |
| La | .06 | 2 | 55 | 900 | 3.11 | 7.80 | 101.2 | 75 | |
| Ce | .06 | 2 | 55 | 900 | 3.10 | 7.99 | 100.8 | 84 | |
| Pr | .06 | 2 | 55 | 900 | 3.14 | 8.09 | 100.5 | 77 | |
| Tb-1 | .06 | 2 | 55 | 900 | 3.19 | 3.16 | 101.4 | 70 | |
| Tb-2 | .06 | 2 | 93 | 900 | 3.16 | 2.87 | 100.9 | 74 | |
| Y | .06 | 2 | 93 | 900 | 3.15 | 2.68 | 102.0 | 78 | |

[1] Medium for all reactions was water except as noted.
[2] Pressure of $CO_2$ for this reaction was increased steadily during the 2 hour period from 200 to 850 p.s.i.

In the carbonate product analyses the molar ratio of $CO_2$ to the metal oxide ($CO_2$/MO) and $H_2O$ to the metal oxide ($H_2O$/MO) and the percent composition data are obtained from oxygen combustion data. The percent composition value is obtained by the addition of the percentages of the sample weight for the three observed combustion products, i.e., oxide, $CO_2$ and $H_2O$. This value includes the weight of $CO_2$ and $H_2O$ resulting from the oxidation of any organic material present in the sample. The amount by which this value exceeds 100.00% is a measure of the organic material (e.g., acetate) present in the product. The percent yield is obtained by determining the amount of oxide equivalent contained in the carbonate product in relation to the total amount of oxide equivalent contained in the original sample of acetate placed in solution.

It will be noted that the experimental reaction time varied from 2–15 hours and that longer times are utilized for room temperature reactions, whereas 2 hours seem normally sufficient at a temperature above about 45° C.

The $CO_2$ pressure varied experimentally between 200 and 950 p.s.i.g., the range between about 500 and 900 p.s.i.g. being preferred. Note that in preparing uranyl carbonate at relatively low temperatures (30–54° C.) 95% ethanol is used as the reaction medium because when (as in sample 5 of the uranyl carbonate) water is used the particle size of the product is very small, the filtration time is greatly extended and the yield is reduced to about half of that obtained with 95% ethanol. If the temperature is increased to about 90° C. (sample 3 of uranyl carbonate) the uranyl carbonate may be prepared under the same conditions as the other carbonates, i.e., 2 hours at 90° C. and under a pressure of about 900 p.s.i.g. $CO_2$ pressure. Use of water produces a better product than that prepared in ethanol by being free of acetate contamination and easier to filter due to the larger particle size obtained at the higher temperature. A yield of 84% is obtained compared to a yield of 88–91% obtained in ethanol.

The higher temperature of 90° C. is not desirable in the case of thorium dicarbonate and the lighter rare earth sesquicarbonates because no precipitate is obtained in the case of thorium, and a hydrous gel which is very difficult to filter occurs with the lighter rare earths. This of course opens the possibility of easily separating thorium and uranium since a temperature of 90° C. will precipitate a large percentage of uranyl carbonate, whereas thorium dicarbonate is not formed under these conditions and, accordingly, no thorium compound precipitate mixes with the uranyl carbonate precipitate. Although the yields do not vary greatly with increasing acetate concentration it is noted that a slight $CO_2$ deficiency in the product begins to occur for thorium dicarbonate at acetate salt concentrations above about 0.05 molar with continued diminution at 0.1 and 0.15 molar. In the case of uranyl carbonate, products less deficient in $CO_2$ are produced with acetate salt concentrations in the range of 0.1–0.15 molar.

Because of thorium's tendency to form basic salts in near neutral or basic solutions due to the formation of the stable thoryl ion under these conditions, the preparation and separation of the dicarbonate of thorium by conventional methods do not appear to have been previously done. As shown by Table I, thorium dicarbonate is formed by the present method with yields above 90%.

Since the primary improvement described herein resides in the use of anhydrous organic salt rather than the hydrated acid salt of applicant's copending U.S. patent application Ser. No. 490,750, it is to be expected that the method would encompass the use of anhydrous propionates, butyrates and formates. Indeed anhydrous propionates may be better suited for the purpose than anhydrous acetates owing to their lower solubility. Troubles could be expected with the butyrates and formates, the former owing to its extremely low solubility and the latter to its relatively high acidity.

Yttrium has been included in the study although not technically a lanthanide since it commonly exhibits properties which would be expected of a metal between holmium and erbium in the lanthanide series.

What is claimed is:

1. In a method of forming a metal carbonate by mixing a metal acetate of the group consisting of a lanthanide rare earth acetate, thorium acetate, uranyl acetate, and yttrium acetate with water and pressurizing the resultant metal acetate-water mixture in carbon dioxide atmosphere, the improvement consisting of employing an anhydrous acetate, and maintaining the carbon dioxide atmosphere pressure between about 500 and 900 pounds, for a period of between about 2 and 15 hours at a temperature of between about 30 and 90° C.

References Cited

UNITED STATES PATENTS 2,625,462   1/1953   Fox ------------------ 23—61

OTHER REFERENCES

"Inorganic and Theoretical Chemistry," Mellor, vol. 12, (Uranium), 1932, Longmano, Green and Co. London, pp. 112–116 (Copy in 23/346).

L. DEWAYNE RUTLEDGE, Primary Examiner.

R. L. GRUDZIECKI, Assistant Examiner.